S. O. Brigham.
Corset.
Nº 56,892.    Patented Aug. 7. 1866.
Fig. 1.
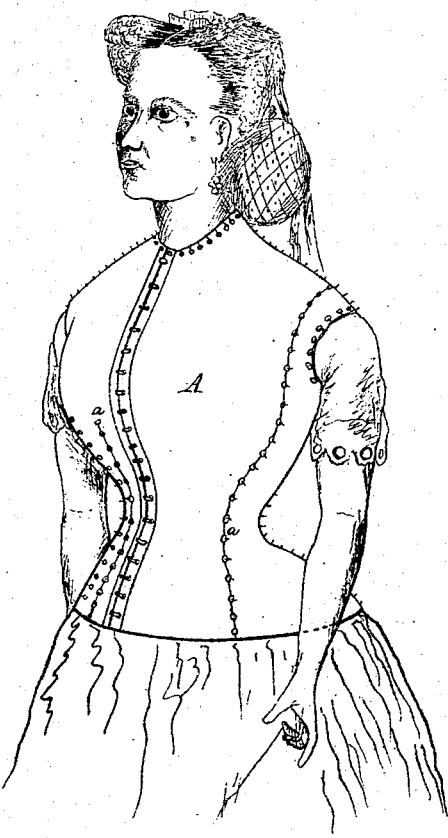
Fig. 2.
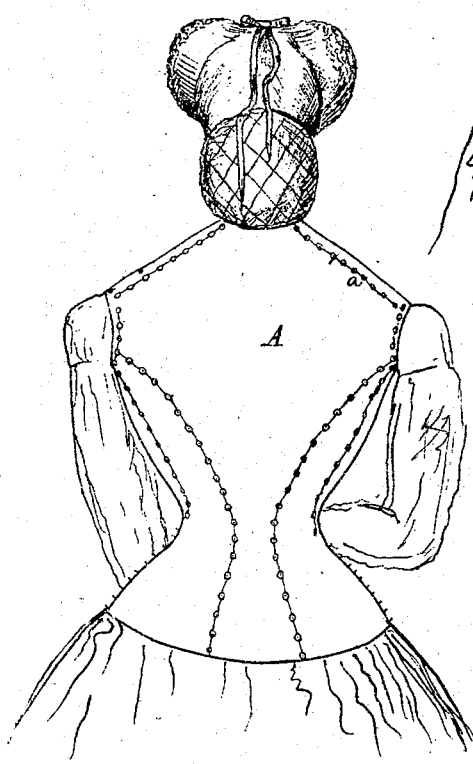
Fig. 3.
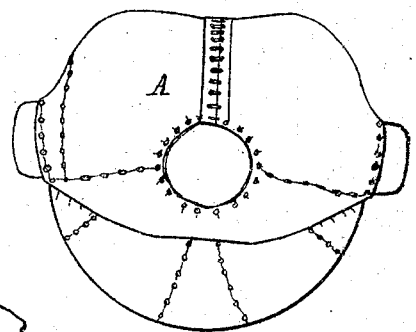
Fig. 4.
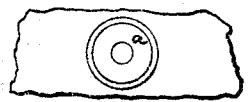
Fig. 5.
Witnesses.    Inventor.

UNITED STATES PATENT OFFICE.

S. O. BRIGHAM, OF SAN FRANCISCO, CALIFORNIA.

IMPROVEMENT IN BODY-CONFORMATORS.

Specification forming part of Letters Patent No. 56,892, dated August 7, 1866.

*To all whom it may concern:*

Be it known that I, S. O. BRIGHAM, of the city and county of San Francisco, and State of California, have invented a new and Improved Conformator for Fitting Garments; and I do hereby declare that the following is a full, clear, and exact description thereof, which will enable others skilled in the art to make and use the same, reference being had to the accompanying drawings, forming a part of this specification.

In the fitting of garments, either for ladies or gentlemen or misses or boys, with any of the now prevalent modes or methods practiced therefor, it is almost impossible, if not entirely so, without exercising the utmost care, to measure the body and such other portions of the person as are necessary to make the garment with sufficient accuracy to insure or produce the desired fit.

With the many instruments or devices heretofore invented and patented for the purpose of fitting the waists of dresses, more especially to ladies or misses, it has been necessary, in every instance, to adjust the various parts composing such instrument to the form of the person, which not only required much time and care, but also considerable experience, to so adjust them that the dress cut out from the result of such adjustment of the instrument would fit the person with the necessary accuracy and smoothness in every part or portion of the same.

To avoid all the difficulties encountered with the instruments or apparatus now in use for the fitting of ladies' or misses' dresses more especially is the principal object of the present invention, although with slight modifications the instrument or device embraced by my improvements can be as well adapted to gentlemen or boys; and they consist in producing or providing an instrument or "conformator," as I term it, for said purposes, of such a construction and arrangement that, when applied to the person, it will adjust itself and perfectly conform thereto in every respect and portion, which conformator is provided at such portions of its exterior as correspond to the positions in which the necessary seams for the making of the dress or other garment are to run with a series of sharp-pointed projecting pins or studs, or any other equivalent device or devices, so that by laying a thin sheet of paper or other suitable material over and upon such conformator when on the person the direction of the seams for the cutting of the dress will be accurately indicated by the puncturing of the said paper by the said pins, and thus, when the paper is cut out in the line of such punctures, a perfect pattern of the person's form will be produced, which, then using upon the cloth or other material of which the dress or other garment is to be made in the usual manner, the dress material can be cut with such accuracy that when properly sewed or stitched together and applied to the person a perfect, accurate, and smooth-fitting garment will be obtained, as will be apparent from the following detail description, reference being had to the accompanying plate of drawings, in which, for the purpose of more fully and distinctly illustrating my invention, it is shown as applied to the waist and body of the figure of a lady.

Figure 1 is a view of the front side; Fig. 2, a view of the back; Fig. 3, a view looking down upon the apparatus; and Figs. 4 and 5, detail views, showing one mode of inserting the pins in the conformator, which will be hereinafter fully explained.

Similar letters of reference indicate like parts.

A in the drawings represents my improved dress or garment fitting instrument, or "conformator," as I term it, which I make of thin tissue or sheet india-rubber or gutta-percha, or of any of their respective elastic compounds, or of any other suitable elastic material or materials, in any proper manner to correspond in general shape and outline to the form of the body of a lady or gentleman, or miss or boy, according to the person on which it is to be used, and of such dimensions that upon persons of the same sex of the average size about the waist and body it can adjust itself to their forms in every particular or part, and lie perfectly smooth thereon, without causing any severe strain or the slightest perceptible pain to the wearer, the conformator being made on the principle of a tight-fitting waist or jacket, buttoning or hooking up in front or on the back, as may be deemed most desirable, and is put on and taken off the person in a similar manner to the same, as is plainly apparent from an inspection of the drawings.

Projecting from this conformator, and in such directions upon the same as correspond to the line of seams necessary for the making of the garment or dress, so as to have it fit nicely and smoothly upon the person, are a series of rows of sharp-pointed pins or studs, a a a, of any desired number, but sufficiently close together to define the line of seam which is to pass through them, these rows of pins being attached to or secured upon the elastic sheet or material of which the conformator is made in such a manner as to be either fixed or permanent in position, or so as to be susceptible of being removed or detached, which latter mode of attachment is illustrated in Figs. 4 and 5, and consists in passing the pins through the elastic sheet, with a suitable washer or ring upon each side of the same.

The mode of securing the pins will admit of innumerable variations, and the one above described and shown in the drawings I deem to possess many advantages, as by means of such attachment the line of direction of the pins can be changed to suit the style of pattern according to which the the dress is to be cut.

In the use of my conformator for the cutting of garments having the features above explained, it is first put on the body of the person for whom the garment is to be fitted, and then buttoned or otherwise properly fastened together, in front or on the back, as the case may be, the elastic material of which the conformator is made causing it to adjust itself in every particular to the form of the person, when, taking a thin sheet of paper or other suitable material and laying it upon and over the surface of the conformator, keeping it smooth and even, the direction of the rows of pins upon the conformator can then be indicated upon the paper by simply pressing upon it with sufficient pressure to cause them to puncture the same; when, cutting the paper in the line of such punctures, it is obvious that a pattern for the dress or garment is produced that, when the material of which the garment is to be made is cut out according thereto and properly sewed or otherwise secured together, a perfect, accurate, and smooth-fitting garment must necessarily be produced.

From the above description of my improved dress or garment fitting conformator, it is manifest that one conformator can be used upon persons varying considerably in the dimensions and outlines of their bodies, as, being made of elastic or flexible material, it adjusts itself immediately and with no trouble or labor to the form of the person on which it is put, indicating in every instance, by its projecting pins, the true line of the seams which it is necessary to make for the perfect fitting of the garment or dress.

In lieu of using pins or studs upon the conformator for indicating the line of seams, as explained, continuous ridges may be formed upon or attached to the same, either made of the same material as the conformator or of different material, and attached thereto in any proper manner, the line of seam upon the pattern with the use of raised ridges, in lieu of pins, being indicated by manipulating the paper in any proper manner to cause the line of direction of such ridges to be indicated upon it—as, for instance, by creasing it.

The conformator hereinabove described is made of an elastic sheet of any suitable material, of such a shape that, when placed upon the person, it will entirely incase such portions of the body as it is intended to cover; but in lieu of being so made it can be formed of strips or bands of elastic material having open spaces between them and properly joined together, so as to constitute a conformator having substantially the characteristics above stated; but I do not deem it expedient or advantageous to so make them, and, in fact, the perfectness of operation cannot be secured in that mode of construction as by that particularly explained and shown in the drawings.

It may be here remarked, in conclusion, that, although I have described two modes in which my conformator can be made so that the lines of seams can be indicated or produced upon the material of which the garment-pattern is to be made, I do not intend to limit myself to any one particular mode or construction of the same for such purpose, the present invention consisting in a self-adjusting conformator having any suitable construction for indicating the line of seams.

I claim as new and desire to secure by Letters Patent—

An apparatus or implement for the cutting and fitting of ladies' dresses and other garments, which, when applied to the person, will adjust itself thereto, and is provided with any suitable means for indicating the line or lines of the seams for the garment to be cut, substantially as herein described.

The above specification of my invention signed by me this 6th day of January, 1866.

S. O. BRIGHAM.

Witnesses:
ALBERT W. BROWN,
M. M. LIVINGSTON.